United States Patent [19]

Hayashi

[11] Patent Number: 5,750,639

[45] Date of Patent: May 12, 1998

[54] POLYAMIDE RESIN COMPOSITION AND MOLDING THEREOF

[75] Inventor: Ryuichi Hayashi, Tokyo, Japan

[73] Assignee: E. I. du Pont de Nemours and Company, Wilmington, Del.

[21] Appl. No.: 682,575

[22] PCT Filed: Jan. 25, 1995

[86] PCT No.: PCT/US95/00936

§ 371 Date: Jul. 24, 1996

§ 102(e) Date: Jul. 24, 1996

[87] PCT Pub. No.: WO95/20630

PCT Pub. Date: Aug. 3, 1995

[30] Foreign Application Priority Data

Jan. 26, 1994 [JP] Japan ............................ 6-006937

[51] Int. Cl.$^6$ .......................... C08G 69/08; C08G 73/10

[52] U.S. Cl. .......................... 528/310; 528/335; 528/332; 528/338; 528/339; 528/340; 528/347; 528/349

[58] Field of Search ........................ 528/310, 349, 528/335, 338, 339, 347, 340, 332

[56] References Cited

U.S. PATENT DOCUMENTS

| | | | |
|---|---|---|---|
| 4,603,166 | 7/1986 | Poppe et al. | 524/606 |
| 4,937,315 | 6/1990 | Barthelemy | 528/349 |
| 4,937,322 | 6/1990 | Barthelemy | 528/349 |
| 5,006,601 | 4/1991 | Lutz et al. | 525/66 |
| 5,122,570 | 6/1992 | Subramanian | 525/66 |
| 5,302,691 | 4/1994 | Soelch | 528/349 |
| 5,322,923 | 6/1994 | Lahary et al. | 528/349 |
| 5,436,294 | 7/1995 | Desio et al. | 525/179 |
| 5,440,006 | 8/1995 | Lahary et al. | 528/349 |

FOREIGN PATENT DOCUMENTS

WO9520630  8/1995  WIPO.

Primary Examiner—P. Hampton-Hightower

[57] ABSTRACT

A polyamide resin composition having good molding fluidity, heat and chemical resistance and dimensional stability is provided containing: (A) 30–90 weight percent, based on components (A) and (B), of a polyamide resin containing (i) 10–99 weight percent, based on components (i) and (ii) of an aromatic polyamide containing a carboxylic acid component derived from terephthalic acid or a mixture of terephthalic and isophthalic acid in which the isophthalic acid constitutes 40 mole percent or less of the mixture, and an aliphatic diamine component derived from a mixture of hexamethylene diamine and 2-methylpentamethylene diamine; and (ii) 1–90 weight percent, based on components (i) and (ii), of at least one polyamide selected from the group consisting of polyamides containing repeat units derived from alipathic dicarboxylic acids and alipathic diamines and polyamides containing repeat units derived from aliphatic aminocarboxylic acids; and (B) 10–70 weight percent, based on components (A) and (B), of an inorganic filler.

6 Claims, No Drawings

POLYAMIDE RESIN COMPOSITION AND MOLDING THEREOF

BACKGROUND OF THE INVENTION

This invention relates to polyamide resin compositions and a type of polyamide resin molding, characterized by the fact that the molding is made of a polyamide resin composition with excellent fluidity during the molding process, and it has excellent mechanical characteristics, heat resistance, chemical resistance and dimensional stability when moisture is absorbed, so that it has a wide range of applications, including parts used in automobiles, electrical/electronic parts, and furniture.

Conventional polyamide resins, such as nylon 66, nylon 6, nylon 612, etc., are aliphatic polyamide resins with a certain level of heat resistance and excellent mechanical characteristics. Consequently, these resins are used in a wide range of applications, such as resin moldings as substitutes for metal parts and resin moldings as substitutes for the parts made of heat-setting resins. However, in some applications, when moisture is absorbed, nylon 6 and nylon 66 exhibit characteristic dimensional changes. Also, stress cracks may take place due to chemicals.

In order to improve the chemical resistance, in particular, the resistance against calcium chloride, and other inorganic salts, for these nylons, nylon 612 or a mixture of nylon 612 and nylon 66 has conventionally been used. However, for the aforementioned mixture, the heat resistance drops due to the presence of nylon 612. This is a disadvantage.

In various applications, different problems exist with current materials.

In the furniture field, glass-fiber-reinforced nylon 66 is widely used in place of conventional metal parts in manufacturing chairs and other articles of furniture used in offices and homes. However, for the aforementioned glass-fiber-reinforced nylon 66, dimensional variation and degradation in properties take place due to moisture absorption.

Additionally, nylon 6 is also used to mold furniture parts to ensure good appearance of the moldings. However, in the case of moisture absorption, dimensional variation and degradation in properties become even more significant when nylon 6 is used.

For the outer parts of electrical products, such as rice cookers, irons, and other home appliances, as well as word processors and other office automation equipment, superior mechanical characteristics such as the ability to withstand high application temperatures, high resistance against hydrolysis and high heat resistance to the high temperatures applied on the products during soldering are required. Also, the appearance of the moldings should be good for some products. However, for the moldings made of the conventional polyamide resin compositions and polyester resin compositions, it is difficult to fully meet the aforementioned requirements.

As parts of electrical/electronic products, such as sealants for connectors, coil bobbins, coils, etc., it is possible to make use of polyamide resin compositions and polyester resin compositions. For these sealants, in addition to the high solder heat resistance, the parts should have a small thickness in order to reduce the weight of the parts. As nylon 66 has good fluidity, it is able to flow through the narrow gaps in the molding dies, so that thin-wall moldings can be formed. On the contrary, the solder heat resistance is poor. This is a disadvantage.

Regarding automotive applications, polyamide resins, in particular, reinforced polyamide resins, are used in manufacturing engine covers, parts connected directly to the engine covers, such as connectors, air intake manifolds, and other engine body parts, radiator tanks, caps, and other cooling system parts, canisters, pipelines, pump parts and other fuel system parts. They are also widely used in manufacturing the general connectors, relay boxes, gears, clips, etc., at present. In particular, nylon 66 is an appropriate type of material for the aforementioned applications, as it has excellent heat resistance, moldability and toughness. However, as pointed out above, when the aforementioned materials are used, variations in dimensions and properties take place as moisture is absorbed. Consequently, it is necessary to predict these variations and to take the appropriate measures in designing the parts. Consequently, their applications are limited, and they are inappropriate for manufacturing high-precision parts.

In addition to the aforementioned problems, there has recently been a high demand for reducing the size and increasing the power of automobile engines. Consequently, the requirement on the heat resistance of the resin products used in the engine room becomes higher and higher. When this requirement is demanded, nylon 66 may be inappropriate in some cases.

For resin materials that are used to solve the aforementioned problems and when moldings are to be made for relatively large-sized parts of automobiles, such as engine covers, radiator tanks, caps, air intake manifolds, etc., fluidity like that of nylon 66 is required. Also, for the aforementioned parts of automobiles, the resistance to various kinds of oil and chemicals should be high. Conventionally, nylon 66 and nylon 6 are widely used, as they have high resistance against lubricants and activating oils. On the other hand, in applications related to long-life coolant (referred to as LLC hereinafter), such as radiator tanks, reservoir tanks, heater cores, and other parts of the cooling system, the resistance to LLC also should be high, depending on the application environment. In addition, in recent years, due to the code in prohibiting studded tires, the frequency of contact between the automobile parts with calcium chloride, calcium/magnesium acetate, and other snow-melting agents has been increased. When moldings made of nylon 66 and nylon 6 come into contact with the aforementioned inorganic salts under the prescribed conditions, stress cracks are sometimes generated, and it might be impossible to maintain the performance of the moldings.

In order to improve the chemical resistance of the aforementioned resins, conventionally, nylon 612, nylon 810, nylon 11, nylon 12 and other long-chain aliphatic polyamides have been used either directly or as mixtures with nylon 66. However, these materials have heat resistances lower than that of nylon 66. This is a disadvantage.

Japanese Kohyo Patent No. Hei 5[1993]-506871 discloses a type of copolymer made of aromatic polyamide consisting of terephthalic acid component units and diamine component units of hexamethylenediamine and 2-methylpentamethylenediamine. However, when the aforementioned aromatic polyamide is used in manufacturing automobile engine covers, air intake manifolds, radiator tanks, and other automobile parts, the legs of office chairs, and other relatively large furniture parts, relatively thin-walled parts and housings, and other electrical/electronic parts, etc., the fluidity of the resin is poor in the molding operation.

Based on the foregoing discussion, a purpose of this invention is to provide a type of polyamide resin composition with excellent fluidity in the molding operation. Another purpose is to provide a type of polyamide resin molding with excellent mechanical characteristics, heat resistance, chemical resistance and dimensional stability upon moisture absorption for use in a wide range of applications, including electrical/electronic applications, furniture applications, and automotive applications.

SUMMARY OF THE INVENTION

In order to realize the aforementioned purposes, the present invention provides a type of polyamide resin composition which comprises:

(A) 30–90 weight percent, based on components (A) and (B), of a polyamide resin containing
  (i) 10–99 weight percent, based on components (i) and (ii) of an aromatic polyamide containing a carboxylic acid component derived from terephthalic acid or a mixture of terephthalic and isophthalic acid in which the isophthalic acid constitutes 40 mole percent or less of the mixture, and an aliphatic diamine component derived from a mixture of hexamethylene diamine and 2-methylpentamethylene diamine; and
  (ii) 1–90 weight percent, based on components (i) and (ii), of at least one polyamide selected from the group consisting of polyamides containing repeat units derived from aliphatic dicarboxylic acids and aliphatic diamines and polyamides containing repeat units derived from aliphatic aminocarboxylic acids; and
(B) 10–70 weight percent, based on components (A) and (B), of an inorganic filler.

The polyamide resin composition of this invention has excellent fluidity during molding. Consequently, molding can be carried out easily for large-sized parts, small-sized parts and thin-walled parts. The moldings exhibit excellent mechanical characteristics, heat resistance, chemical resistance and dimensional stability. Consequently, they can be used not only in the field of automobiles, electrical/ electronic parts and furniture, but also in the other fields. In particular, the polyamide resin composition moldings of this invention have all of the required characteristics for under-the-hood parts of automobiles, and they can be used for a long period of time.

DETAILED DESCRIPTION OF THE INVENTION

The present invention provides a type of polyamide resin composition which comprises:

(A) 30–90 weight percent, based on components (A) and (B), of a polyamide resin containing
  (i) 10–99 weight percent, based on components (i) and (ii) of an aromatic polyamide containing a carboxylic acid component derived from terephthalic acid or a mixture of terephthalic and isophthalic acid in which the isophthalic acid constitutes 40 mole percent or less of the mixture, and an aliphatic diamine component derived from a mixture of hexamethylene diamine and 2-methylpentamethylene diamine; and
  (ii) 1–90 weight percent, based on components (i) and (ii), of at least one polyamide selected from the group consisting of polyamides containing repeat units derived from aliphatic dicarboxylic acids and aliphatic diamines and polyamides containing repeat units derived from aliphatic aminocarboxylic acids; and
(B) 10–70 weight percent, based on components (A) and (B), of an inorganic filler.

In present invention, the aromatic polyamide defined in (A)(i) has an intrinsic viscosity in sulfuric acid at 25° C. in the range of 0.2–3.0. Also, the melting point is in the range of 280°–330° C. The mixture of hexamethylene diamine and 2-methylpentamethylene diamine preferably contains 40–90 mole percent, based on the mixture, of hexamethylene diamine. This aromatic polyamide can be manufactured by means of polycondensation well known by those persons skilled in the art.

The polyamide defined in (A)(ii) is basically used for adjusting the fluidity of the polyamide resin composition of this invention according to the intended application of use. Examples of the polyamide defined in (A)(ii) include nylon 66, nylon 6, nylon 612, nylon 46, nylon 11, nylon 12 and other aliphatic polyamides. When these aliphatic polyamides are blended with the aforementioned aromatic polyamide to form the polyamide resin of component (A), it is possible to adjust the fluidity in molding operation.

As far as the blending method is concerned, it is possible to use a biaxial extruder to perform melting/blending of the polyamides, or to blend two types of polyamides in pellet form before molding.

Also, it is possible to obtain a polymer with the desired molecular weight by the polymerization of low-molecular substances that form the various polyamides or of a mixture of the various polyamides and the low-molecular substances that form the polyamides.

Also, it is possible to manufacture the aforementioned polyamide resin by means of polycondensation of terephthalic acid alone or its mixture with isophthalic acid, adipic acid, hexamethylenediamine, and 2-methylpentamethylenediamine. The polyamide resin prepared in the aforementioned process of polymerization/ blending or blending is then used for injection molding or extrusion molding to form the molding product.

The amount of the aforementioned aliphatic polyamide should be in the range of 1–90 weight percent, or preferably in the range of 5–85 weight percent, based on the total of aromatic and aliphatic polyamides.

When the amount of the aromatic polyamide in the polyamide resin is less than 10 weight percent, it is difficult to find the difference between the polyamide resin composition and nylon 66 or other aliphatic polyamide with respect to the heat resistance and dimensional stability, and the effect of adding the aforementioned aromatic polyamide becomes insignificant. For example, for automotive parts, the improvements in heat resistance and the resistance to calcium chloride are insignificant. Also, for parts of furniture, there is no significant improvement in the variation of dimensions caused by moisture absorption.

The amount of the aforementioned aliphatic polyamide in the polyamide resin should be determined appropriately according to the type and size of the molded part. When relatively large-sized parts, such as engine covers, air intake manifolds, radiator tanks, etc., are manufactured, the fluidity of the resin should be high in the molding operation. Consequently, in this case, the amount should be larger than that in the case of small-sized parts. Even when small parts are manufactured, if the application is for thin-wall connectors, sealants, etc., a high fluidity of the resin during molding is still required. Consequently, an appropriate amount of aliphatic polyamide should be added into the polyamide resin.

Further, for the polyamide resin composition of this invention, the amount of the inorganic filler added should be in the range of 10–70 weight percent, or preferably in the range of 15–60 weight percent, based on the polyamide resin and the inorganic filler. Examples of inorganic fillers that can be used include glass fibers, carbon fibers, calcium titanate, whiskers, kaolin, talc, mica, etc. If it is necessary to increase the mechanical strength of the molding, it is preferable to add glass fibers. If it is necessary to increase the dimensional stability of the molding and to suppress warpage, kaolin, talc, mica or glass flakes may be added. If the amount of the inorganic filler is less than 10 weight percent, the mechanical characteristics desired in many applications cannot be obtained for the molded part.

In addition, for the polyamide resin composition of this invention, as long as the characteristics of the obtained molding are not degraded, other additives, such as thermal stabilizers, plasticizers, oxidation inhibitors, dyes, pigments, mold-release agents, etc., may be added in appropriate amounts in addition to the aforementioned aromatic polyamide, aliphatic polyamide, and inorganic filler.

For preparing the moldings of the present invention, various conventional molding methods may be adopted, such as compression molding, injection molding, blow molding and extrusion molding. Also, depending on the demand, it is possible to post process the molding to form the product.

EXAMPLES

In the following, this invention will be explained in more detail with reference to application examples.

Application Examples 1–4 and Comparative Examples 1–3

The various components listed in Table I were melt-blended in a biaxial extruder (TEM35, made by Toshiba). After cooling by water, pellets were manufactured. The obtained pellets were used to mold specimens measuring 13 mm×130 mm×3.2 mm according to ASTM D838. The obtained specimens were used to measure the mechanical characteristics. The measurements were made according to the following test methods.

(1) Tensile Strength: ASTM D638
(2) Elongation: ASTM D638
(3) Flexural Modulus: ASTM D790
(4) Flexural Strength: ASTM D790
(5) Notched Izod: ASTM D256
(6) Load Warpage Temperature: ASTM D648
(7) Resistance to Calcium Chloride: Under stress of 200 kg/cm², saturated solution of calcium chloride was coated at 23° C. and then dried at 100° C. for 2 hours. This operation was then repeated, and the condition of the surface of the specimen was observed.
(8) LLC Resistance: The specimen was dipped for 100 hours in 50% aqueous solution of ethylene glycol at 120° C., followed by setting at room temperature, and then a tensile test was carried out according to the method disclosed in (1). In this case, the result was compared with the tensile strength measured right after molding.
(9) Appearance: The surface gloss of a plate molding measuring 75 mm×100 mm×3.2 mm was inspected visually and was rated according to a 3-value rating system. Excellent surface gloss was assigned a value of 1; good surface gloss was assigned a value of 2; and poor surface gloss was assigned a value of 3.
(10) Change in Dimensions: Immediately after a plate measuring 75 mm×100 mm×3.2 mm was molded, and then after it was saturated with water by absorption at 50° C., the dimensions were measured, and the difference was calculated.
(11) Fluidity: The spiral flow at a resin temperature of 310° C., injection pressure of 800 kgf/cm² and a die temperature of 120° C. was measured.

The aromatic polyamides used in Application Examples 1–4 were mixtures made of terephthalic acid and hexamethylenediamine and 2-methylpentamethylenediamine. The amount of hexamethylenediamine in the diamine component was 50 mol %, and the amount of 2-methylpentamethylenediamine was also 50 mol %.

As nylon 66, an aliphatic polyamide listed in Table I, Zytel® 101, produced by E. I. du Pont de Nemours and Company, was used. As nylon 612, Zytel® 151L, also manufactured by E. I. du Pont de Nemours and Company was used. Also, as glass fibers, 10-μm chopped strands manufactured by Nippon Sheet Glass Co., Ltd., were used.

The results of tests (1)–(5) are listed in Table II, and the results of tests (6)–(11) are listed in Table III.

TABLE I

| Application Example | Comparative Example | Aromatic Polyamide (%) | Nylon 66 (%) | Nylon 612 (%) | Glass Fibers (%) |
|---|---|---|---|---|---|
| 1 | | 22 | 45 | — | 33 |
| 2 | | 33 | 33 | — | 33 |
| 3 | | 45 | 22 | — | 33 |
| 4 | | 45 | — | 22 | 33 |
| | 1 | 67 | — | — | 33 |
| | 2 | — | 67 | — | 33 |
| | 3 | — | — | 67 | 33 |

TABLE II

| Property | Temperature | Relative Humidity | Test Method | Units | Application Example 1 | Application Example 2 | Application Example 3 | Comparative Example 1 | Comparative Example 2 | Comparative Example 3 |
|---|---|---|---|---|---|---|---|---|---|---|
| Tensile Strength | 23° C. | 50% | D638 | (kgf/cm²) | 2,090 | 2,250 | 2,220 | 2,310 | 1,900 | 1,690 |
| | 23° C. | | | | 1,580 | — | 1,960 | 2,090 | 1,270 | 1,410 |
| | 120° C. | | | | 950 | 910 | — | 980 | 910 | 790 |
| Tensile Breaking Elongation | 23° C. | 50% | D638 | (%) | 2.6 | 2.4 | 2.5 | 2.6 | 3 | 5 |
| | 23° C. | | | | 3.9 | — | 2.6 | 2.2 | 4 | 5 |
| | 120° C. | | | | 7.8 | 7.5 | — | 3.8 | 7 | 9 |

TABLE II-continued

| Property | Temperature | Relative Humidity | Test Method | Units | Application Example 1 | Application Example 2 | Application Example 3 | Comparative Example 1 | Comparative Example 2 | Comparative Example 3 |
|---|---|---|---|---|---|---|---|---|---|---|
| Flexural Strength | 23° C. | 50% | D790 | (kgf/cm²) | 3,040 | 3,070 | 3,000 | 3,210 | 2,670 | 2,600 |
|  | 23° C. |  |  |  | 2,430 | — | 2,800 | 2,878 | 2,100 | 1,700 |
|  | 120° C. |  |  |  | 1,330 | 1,360 | — | 1,900 | 1,400 | 1,000 |
| Flexural Modulus | 23° C. | 50% | D790 | (kgf/cm²) | 108,500 | 117,800 | 110,900 | 115,300 | 91,400 | 84,400 |
|  | 23° C. |  |  |  | 86,000 | — | 109,900 | 116,400 | 63,300 | 62,400 |
|  | 120° C. |  |  |  | 47,900 | 48,700 | — | 87,390 | 42,800 | 36,000 |
| Notched Izod Impact | 23° C. | 50% | D256 | (kgf/cm²) | 10 | 11 | 10 | 11 | 11 | 14 |
|  | 23° C. |  |  |  | 10 | 10 | 10 | 10 | 14 | 14 |
| Load Warpage Temperature | 23° C. | 50% | D648 | (°C.) | 244 | 245 | — | 262 | 249 | 212 |
|  | 23° C. |  |  |  |  |  |  |  |  |  |

TABLE III

| Application Example | Comparative Example | Surface Gloss | % Change in Dimensions Due to H₂O Absorption at 100% RH | Calcium Chloride Resistance (No. of Cycles Until Breaking) | % Retention of Tensile Strength (LLC Resistance) | Fluidity (Flow Length in cm) |
|---|---|---|---|---|---|---|
| 1 |  | 1 | 0.78 |  | 64 | 77 |
| 2 |  | 1 | — | Not Broken (Crack Free) | — | 67 |
| 3 |  | 3 | 0.65 | Not Broken (Crack Free) | 82 | 57 |
| 4 |  | 2 | — | Not Broken (Crack Free) | — | 99 |
|  | 1 | 2 | 0.65 | Not Broken (Crack Free) | 89 | 35 |
|  | 2 | 2 | 1.16 | 7 | 53 | 94 |
|  | 3 | 1 | 0.43 | Not Broken (Crack Free) | 63 | >120 |

As can be seen from Table II, the resin compositions in Application Examples 1–4 have mechanical characteristics superior to those of the resin composition in Comparative Example 2. As can be seen from Table III, when the resin compositions in Application Examples 1–4 were compared with Comparative Example 1, the fluidity in molding was improved by adding nylon 66 or nylon 612. When the moldings of resin compositions in Application Examples 1–4 were compared with those in Comparative Examples 2 and 3, there was better retention of mechanical properties (i.e., tensile strength). When the moldings made of the resin compositions in Application Examples 1–4 were compared with that in Comparative Example 2, the resistance to calcium chloride was improved significantly and dimensional stability was improved as well.

I claim:

1. A polyamide resin composition comprising:
   (A) 30–90 weight percent, based on components (A) and (B), of a polyamide resin containing
      (i) 10–99 weight percent, based on components (i) and (ii) of an aromatic polyamide containing a carboxylic acid component derived from terephthalic acid or a mixture of terephthalic and isophthalic acid in which the isophthalic acid constitutes 40 mole percent or less of the mixture, and an aliphatic diamine component derived from a mixture of hexamethylene diamine and 2-methylpentamethylene diamine; and
      (ii) 1–90 weight percent, based on components (i) and (ii), of at least one polyamide selected from the group consisting of polyamides containing repeat units derived from aliphatic dicarboxylic acids and aliphatic diamines and polyamides containing repeat units derived from aliphatic aminocarboxylic acids; and
   (B) 10–70 weight percent, based on components (A) and (B), of an inorganic filler.

2. A polyamide resin composition as recited in claim 1, wherein the mixture of hexamethylene diamine and 2-methylpentamethylene diamine of component (i) contains 40–90 mole percent, based on said mixture, of hexamethylene diamine.

3. An article molded from a polyamide resin composition as recited in claim 1.

4. An article as recited in claim 3 for use in electrical or electronic applications.

5. An article as recited in claim 3 for use in automotive applications.

6. An article as recited in claim 3 for use in furniture applications.

* * * * *